United States Patent [19]

Schmidt

[11] Patent Number: 4,567,056

[45] Date of Patent: Jan. 28, 1986

[54] EDIBLE FAT AND A PROCESS FOR PRODUCING SUCH FAT

[75] Inventor: Werner J. Schmidt, Hamburg, Fed. Rep. of Germany

[73] Assignee: Lever Brothers Company, New York, N.Y.

[21] Appl. No.: 622,355

[22] Filed: Jun. 19, 1984

[30] Foreign Application Priority Data

Jun. 21, 1983 [NL] Netherlands ................... 8302198

[51] Int. Cl.$^4$ ............................................. A23D 5/02
[52] U.S. Cl. ..................................... 426/607; 426/603
[58] Field of Search ................................. 426/603, 607

[56] References Cited

U.S. PATENT DOCUMENTS

| 3,796,581 | 3/1974 | Frommhold. | |
|---|---|---|---|
| 3,949,105 | 4/1976 | Wieske et al. . | |
| 4,055,679 | 10/1977 | Kattenberg et al. | 426/607 |
| 4,087,564 | 5/1978 | Poot et al. | 426/607 X |
| 4,460,614 | 7/1984 | Stratmann et al. | 426/607 X |

FOREIGN PATENT DOCUMENTS 41303 12/1981 European Pat. Off. .
70050 1/1983 European Pat. Off. .

OTHER PUBLICATIONS

Haighton, "The Measurement of the Hardness of Margarine and Fats with Cone Penetrometers", J. Am. Oil Chem. Soc., 36, 345–348 (1959).

van den Enden et al., "A Method for the Determination of the Solid Phase Content of Fats Using Pulse Nuclear Magnetic Resonance", Fette, Seifen, Anstrichmittel, 80, 180–186 (1978).

Primary Examiner—Robert Yoncoskie
Attorney, Agent, or Firm—Lynne Darcy; James J. Farrell

[57] ABSTRACT

There is disclosed an edible fat suitable for producing margarines and low-fat spreads displaying good spreadability, melting behaviour and plasticity.

Said fat is produced by interesterifying a mixture consisting of a liquid oil, a partially hydrogenated oil and a fully saturated fat, and fractionating to obtain a higher melting stearin and an olein which is substantially free from triglycerides from 3 saturated $C_{16}$–$C_{18}$ fatty acids and has a level of triglycerides from 2 saturated fatty acids and 1 mono-cis or polyunsaturated fatty acid, which is higher than 15%. The interesterified mixture may contain some lauric fats.

The olein can be used as such or can be mixed with palm oil and/or hydrogenated palm oil to produce spreads.

8 Claims, No Drawings

EDIBLE FAT AND A PROCESS FOR PRODUCING SUCH FAT

The present invention relates to an edible fat, to a process for producing said fat and to oil-and-water-emulsion spreads containing said fat.

There is a need of margarines and low-fat spreads which display (i) a good spreadability, which means that they are not hard when spread on bread, (ii) a good melting behaviour on consumption, which means that little or no waxiness is perceived and (iii) good coolness properties, which means that the product melts quickly under the temperature and shear conditions prevailing in the mouth, giving an oral response similar to the coolness perceived on consumption of chocolate fats.

There is also a need of fats which can be produced from relatively cheap ingredients, such as soybean oil and rapeseed oil, without recourse to the use of too high a proportion (e.g. 50% or higher) of palm oil or laurics such as coconut and palmkernel oil.

There is also a need of an economical, continuous process wherein any stearin produced during fractionation can be re-circulated.

Applicants have found a new fat and a new process for producing said fat which to a great extent meets the above needs and desiderata.

The edible fat according to the invention is characterized in that:

(i) the level of triglycerides from 3 saturated fatty acids with 16 or more carbon atoms, abbreviated as $S_3$-triglycerides, ranges from 0 to 6 wt. %;

(ii) the level of triglycerides from 2 saturated fatty acids with 16 or more carbon atoms and 1 mono-cis or poly-unsaturated fatty acid with 18 or more carbon atoms, abbreviated as $S_2U$-triglycerides, is at least 15 wt. %, more than 50 wt. % of said $S_2U$-triglycerides being asymmetrical; and (iii) the fat solids profile is:

$N_{10°\ C.}$ is greater than 20
$N_{20°\ C.}$ is greater than 10
$N_{35°\ C.}$ is smaller than 3.

The fat solids profile is expressed in N values at various temperatures, giving the level of crystallised fat in %, essentially as described in Fette, Seifen, Anstrichmittel 80, 180–186, 1978, with the exception that the fat is first stabilised for 16 hours at 0° C. and subsequently 1 hour at measuring temperature. The relatively low $N_{35}$ value is responsible for a good melting behaviour in the mouth. The relatively high $N_{20}$ value will impart good stand-up properties at room temperature, whereas the relatively high level of $S_2U$-triglycerides will lead to a high plasticity and toughness in the final product. The preferred ranges for the fat solids profile are therefore selected such that $N_{10°\ C.} = 30-55$, $N_{20°\ C.} = 14-28$ and $N_{35°\ C.} = 0-2$.

The preferred level of $S_2U$-triglycerides preferably ranges from 20–35 wt. %.

The coolness imparted by the fat is generally defined as the difference between the fat solids level at 15° and 25° C. $N_{15°\ C.} - N_{25°\ C.}$. For imparting a good coolness this difference is preferably greater than 15 and ranges preferably from 18–35.

The level of triglycerides containing trans-fatty acids also contributes to the coolness of the product. On the other hand, in view of recent trends in dietetics, the level of trans-fatty acids should not exceed certain limits. The level of trans-fatty acids therefore preferably does not exceed 25 wt. %, whereas the ideal levels range from 5 to 20 wt. %.

Such trans-fatty acids result from a partial hydrogenation of saturated oils under conditions conducive to isomerism. These conditions are well known in the art. One of the main factors leading to isomerism is the choice of specific catalysts such as a sulphur-poisoned nickel catalyst.

The hardness of the fat according to the invention also requires some attention. Since the fat according to the invention should have a reasonable consistency at ambient temperature (about 20° C.), it is important that the hardness of the fat expressed in C values measured at 20° C. as described in J.A.O.C.S. 36 (1959), pages 345–348, is higher than 70 g/cm$^2$ and preferably ranges from 200–400 g/cm$^2$.

The edible fats according to the invention preferably contain (A) 50 to 100 wt. % of an olein obtained by (i) fractionation of a randomly interesterified mixture of triglycerides from an oil (a) which is free from crystallised fat at 10° C., a partially hydrogenated oil (b) having a melting point ranging from 25° to 50° C. and a saturated oil (c) having an iodine value lower than 10, to obtain on the one hand a higher melting stearin fraction containing substantially all the $S_3$-triglycerides as hereinbefore defined, which stearin is removed and, on the other hand, a lower melting olein fraction containing 0–6 wt. % of said $S_3$-triglycerides, and (B) 0–50 wt. % of a hydrogenated fat, a non-hydrogenated fat or a mixture thereof.

The mixture subjected to interesterification may further contain an oil (d) rich in triglycerides from $C_{12}$-and $C_{14}$-fatty acids (laurics), which is preferably selected from the group consisting of palmkernel-, coconut-, babassu-, tucum-, ouricurum- and murumuru oil and fractions thereof.

The proportions of said oils which are preferably used lie within the following ranges:

30–60 wt. % for oil (a)
5–40 wt. % for oil (b)
25–45 wt. % for oil (c) and
0–30 wt. % for oil (d), the sum of the above percentages being 100%.

Fat (B) preferably contains palm oil, part of which may be hydrogenated to a melting point preferably ranging from 38° to 45° C.

The lower the amount of component (d), the higher the level of fat (B) can be. Especially when palm oil and/or hydrogenated palm oil is used, the amount of it should be such that the $N_{20°\ C.}$ value is kept as high as possible while maintaining the $N_{35°\ C.}$ within the prescribed range.

In the preferred fats according to the invention the level of palm oil is kept below 20 wt. %, whereas the remainder of the fat preferably consists of oil (a) in non-hydrogenated form, in partially hydrogenated form [i.e. oil (b)] or in saturated form [i.e. oil (c)]. It is very convenient that oils (a), (b) and (c) originate from the same source and ideally from soybean or rapeseed oil.

Oil (a) is an oil which is preferably selected from the group consisting of soybean-, sunflower-, safflower-, rapeseed-, cottonseed-, maise- and olive oil.

Oil (b) can be any of the oils falling under the definition of oil (a) which has been subjected to hydrogenation under conditions conducive to a level of fatty acids in the trans-configuration preferably ranging from 30 to 70 wt. % (determined by infrared analysis) and to a melting point ranging from 30° to 45° C.

Oil (c) can be any of the oils falling under the definition of oil (a) which has been subjected to hydrogenation up to the point of substantially complete saturation corresponding to an iodine value lower than 10.

A particular characteristic of the olein fraction of the fats described above is the relative levels of the saturated $C_{18}$-fatty acids, the mono-unsaturated $C_{18}$-fatty acids and the $C_{18}$-di-unsaturated fatty acids which are as follows:

$C_{18}$-saturated = 19–38 wt. %
$C_{18}$-mono-unsaturated = 20–28 wt. %
$C_{18}$-polyunsaturated = 22–39 wt. %

The fats according to this invention are useful ingredients for producing oil-and-water-emulsion spreads, particularly margarines and halvarines, wherein the fat phase consists of the fats as defined above.

The edible fats according to this invention are produced according to a process comprising: (1) randomly interesterifying a mixture of:
30–60 wt. % of an oil (a) which is substantially free from crystallised fat at 10° C.,
5–40 wt. % of a partially hydrogenated oil (b) having a melting point ranging from 25° to 50° C.,
25–45 wt. % of a saturated oil (c) having an iodine value lower than 10,
0–30 wt. % of an oil (d) rich in triglycerides from $C_{12}$- and $C_{14}$-fatty acids, the sum of percentages of (a)+(b)+(c) being 100 wt. %;
(2) fractionating the interesterified mixture to obtain a higher melting stearin fraction which contains substantially all triglycerides from 3 saturated fatty acids with 16 or more carbon atoms ($S_3$-triglycerides) and a lower melting olein which contains 0–6% of said $S_3$-triglycerides;
(3) mixing 50 to 100 wt. % of the olein obtained with 0–50 wt. % of a hydrogenated or a non-hydrogenated fat to obtain a fat as defined hereinbefore.

Random interesterification of the oils can be carried out in a way known per se, using as a catalyst alkali metals, their alloys or alkoxides at a level of 0.01–0.5 % at 25°–175° C., preferably 80°–140° C., under moisture-free conditions, or using a mixture of sodium hydroxide and glycerol.

Fractionation can be carried out in the presence of an organic solvent such as acetone or hexane (wet fractionation) or in the presence of an aqueous solution of a detergent (Lanza fractionation) or in the absence of a solvent (dry fractionation).

Preferably dry fractionation is applied at 30°–38° C., preferably 32°–35° C., to obtain a stearin fraction which is rich in $S_3$-triglycerides as hereinbefore defined, and an olein fraction which is rich in $S_2U$-triglycerides as hereinbefore defined, and is substantially free from $S_3$-triglycerides.

The process defined above can be carried out in an economical and continuous manner by adding the stearin fraction obtained in the fractionation step, as such or after hydrogenation, to the mixture to be interesterified. The proportion of stearin added should be such that the fatty acids composition of the total mixture (original mixture of oils) does not change to an appreciable extent.

Oil-and-water-containing emulsion spreads, particularly margarines and low-fat spreads, can be produced by emulsifying a fat phase containing fat according to the present invention with an aqueous phase and subjecting the emulsion thus obtained to a texturisation treatment involving working and cooling, for instance as described in Margarine by A. J. C. Andersen, second revised edition, 1965, Pergamon Press.

The invention will now be illustrated in the following examples.

EXAMPLE 1

An olein fraction was produced by:

(1) randomly interesterifying a mixture consisting of 46% by weight soybean oil, 10% by weight coconut oil, 12% by weight soybean oil hydrogenated with a sulphur-poisoned nickel catalyst to a melting point of 36° C. and having a level of trans-fatty acids of 64% by weight and 32% by weight fully hydrogenated soybean oil with a melting point of 60° C., interesterification being carried out using a vacuum-dried mixture of the oils at 120° C. for 20 minutes in the presence of 0.12% by weight $NaOC_2H_5$;

(2) fractionating the interesterified mixture in the absence of solvent (dry fractionation) at 34° C. to obtain an olein fraction and a stearin fraction.

The olein had the following fat solids profile expressed in N-values determined essentially as described in Fette, Seifen, Anstrichmittel 80, 180–186 (1978).

The method was, however, modified regarding the stabilisation of the material before measurement. In all cases the fat was stabilised for 16 h at 0° C. and 1 h at measuring temperature.

| | |
|---|---|
| $N_{10} = 51.4$ | $N_{25} = 9.7$ |
| $N_{15} = 36.5$ | $N_{30} = 3.8$ |
| $N_{20} = 21.5$ | $N_{35} = 0.4$. |

The level of linoleic acid residues was 26.7% and the level of trans-fatty acids was 8%. (These levels were determined by infrared analysis.) The level of $S_3$-triglycerides was 2.2% (determined by a combination of gas/liquid chromatography [GLC], thin layer chromatography [TLC], high pressure liquid chromatography [HPLC] and calculation). The level of $S_2U$-triglycerides was 20% (determined by GLC, TLC, HPLC and calculation).

The stearin obtained during the fractionation was hydrogenated to a melting point of 60° C. and was then fed as a component of the mixture to be interesterified, in a proportion such that the fatty acids composition of this mixture was substantially equal to the fatty acids composition of the starting mixture. (See Table A.)

TABLE A

| | Starting Mixture | Recirculation mixture |
|---|---|---|
| | 46% soybean oil | 46% soybean oil |
| | 10% coconut oil | 7% coconut oil |
| | 12% soybean oil | 12% soybean oil |
| | (m.p. 36° C.) | (m.p. 36° C.) |
| GLC analysis | 32% soybean oil | 35% stearin |
| Fatty acids | (m.p. 60° C.) | (m.p. 60° C.) |
| $C_8$ | 0.7 | 0.7 |
| $C_{10}$ | 0.6 | 0.6 |
| $C_{12}$ | 4.9 | 5.0 |
| $C_{14}$ | 2.2 | 2.2 |
| $C_{15}$ | 0.1 | 0.1 |
| $C_{16}$ | 11.0 | 11.6 |
| $C_{17}$ | 0.1 | 0.2 |
| $C_{18}$ | 29.7 | 27.7 |
| $C_{18:1}$ | 21.0 | 20.6 |
| $C_{18:2}$ | 25.3 | 26.2 |
| $C_{18:3}$ + $C_{20:1}$ | 3.9 | 4.1 |
| $C_{20}$ | — | 0.6 |
| $C_{22}$ | 0.4 | 0.4 |

A margarine was produced by mixing an aqueous phase (20% by weight) with the olein and processing the mixture through a Votator apparatus as described in Margarine, by A. J. C. Andersen, second revised edition, 1965, Pergamon Press, to obtain a plastic water-in-oil emulsion having a hardness expressed in C value at 20° C. of 220 g/cm², determined according to the method described in J.A.O.C.S., 36 (1959), pages 345–348. After storage for four weeks the margarine was presented to a panel of experts who assessed the organoleptic properties and the spreadability of the product.

The product displayed a good coolness, no waxiness and a good spreadability.

EXAMPLE 2

An olein fraction was produced by:

(1) randomly interesterifying a mixture consisting of 46% by weight soybean oil, 10% by weight coconut oil, 12% by weight soybean oil hydrogenated to a melting point of 36° C. using a sulphur-poisoned catalyst, 33% by weight soybean oil hydrogenated to a melting point of 60° C., applying the same conditions as in Example 1, and (2) fractionating the interesterified mixture under the same conditions as in Example 1, to obtain an olein fraction and a stearin fraction which was hydrogenated and recirculated as described in Example 1.

A margarine fat blend was produced from 20% by weight soybean oil and 80% by weight of the olein fraction. The fat blend had the following fat solids profile:

| | |
|---|---|
| $N_{10} = 38.7$ | $N_{25} = 7.8$ |
| $N_{15} = 25.1$ | $N_{30} = 2.6$ |
| $N_{20} = 17.7$ | $N_{35} = 0.4$ |

The level of linoleic acid was 34%.
The level of trans-fatty acid was 8.5%.
The level of $S_3$-triglycerides was 2.0%.
The level of $S_2U$-triglycerides was 19.8%.

A margarine was produced according to Example 1. The hardness value of this product at 20° C. was 100 g/cm² after storage for four weeks.

The margarine was presented to a panel of experts who assessed the organoleptic properties and the spreadability of the product.

The product displayed a good coolness, no waxiness and a good spreadability.

EXAMPLE 3

An olein fraction was produced by:

(1) randomly interesterifying a mixture of 50% by weight soybean oil, 14% by weight soybean oil hydrogenated to a melting point of 36° C. using a sulphur-poisoned nickel catalyst and 36% by weight soybean oil hydrogenated to a melting point of 60° C., under the conditions outlined in Example 1;

(2) fractionating the interesterified mixture under the conditions outlined in Example 1 to obtain an olein fraction and a stearin fraction which was hydrogenated and recirculated as in Example 1.

90% by weight of the olein was mixed with 10% by weight palm oil to obtain a margarine fat blend having the following fat solids profile:

| | |
|---|---|
| $N_{10} = 49.6$ | $N_{25} = 6.7$ |
| $N_{15} = 36.2$ | $N_{30} = 2.5$ |
| $N_{20} = 16.8$ | $N_{35} = 0.4$ |

The level of linoleic acid was 30%.
The level of trans-fatty acid was 8.5%.
The level of $S_3$-triglycerides was 2.4%.
The level of $S_2U$-triglycerides was 30%.

A margarine was prepared according to Example 1 and its hardness was measured at 20° C. after storage for four weeks. The C value was 110 g/cm².

This margarine was presented to a panel of experts who assessed the organoleptic properties and the spreadability of the product.

The product displayed a good coolness, no waxiness and a good spreadability.

EXAMPLE 4

The procedure of Example 3 was repeated, with the following modifications:

70% by weight of the olein was mixed with 20% by weight of soybean oil and 10% by weight of palm oil hydrogenated to a melting point of 42° C., to obtain a margarine fat blend having the following fat solids profile:

| | |
|---|---|
| $N_{10} = 39.9$ | $N_{25} = 6.9$ |
| $N_{15} = 27.0$ | $N_{30} = 2.2$ |
| $N_{20} = 14.7$ | $N_{35} = 0.3$ |

The level of linoleic acid was 33.3%.
The level of trans-fatty acids was about 11%.
The level of $S_3$-triglycerides was 2.3%.
The level of $S_2U$-triglycerides was 23%.

A margarine was prepared from the above-mentioned fat blend, according to Example 1.

This margarine was presented to a panel of experts, who assessed the organoleptic properties and the spreadability of the product.

The product displayed a good coolness, no waxiness and a good spreadability.

I claim:

1. A process for producing an edible fat, comprising:
   (1) randomly interesterifying a starting mixture of oils comprising 30–60 wt. % of oil (a) selected from the group consisting of soybean-, sunflower-, safflower-, rapeseed-, cottonseed-, maize- and olive oil, wherein said oil (a) is free from crystallized fat at 10° C.; 5–40 wt. % of a partially hydrogenated oil (b) selected from the group consisting of soybean-, sunflower-, safflower-, rapeseed-, cottonseed-, maize- and olive oil, wherein said oil (b) has been subjected to hydrogenation under conditions resulting in from 30 to 70 wt. % fatty acids in the trans-configuration and a melting Point of from 30° to 45° C.; and 25–45 wt. % of a saturated oil (c) selected from the group consisting of soybean-. sunflower-, safflower-, rapeseed-, cottonseed-, maize- and olive oil, wherein said oil (c) has an iodine value of less than 10;
   (2) fractionating the interesterified mixture to obtain a higher melting stearin fraction having substantially all the $S_3$-triglycerides in said mixture, and a lower melting olein fraction containing 0–6 wt. % of said $S_3$-triglycerides;

(3) mixing 50-100 wt. % of said olein fraction with 0-50 wt. % of an oil selected from the group consisting of palm oil and a mixture of palm oil and palm oil hydrogenated to a melting point of from 38° to 45° C. to obtain edible fat.

2. A process according to claim 1, wherein said starting mixture further comprises 0-30 wt. % of an oil (d) rich in triglycerides from $C_{12}$ and $C_{14}$ fatty acids.

3. A process according to claim 2 wherein oil (d) is selected from the group consisting of palm kernel-, coconut-, babassu-, tucum-, curicurum-, murumuru oil and fractions thereof.

4. A process according to claim 1, wherein said palm oil or mixture of palm oil and hydrogenated palm oil of step (3) comprises less than 20 wt. % of the total fat.

5. A process according to claim 1, wherein the olein fraction comprises triglycerides comprising from 19-37 wt. % $C_{18}$ saturated fatty acids, from 20 to 28 wt. % $C_{18}$ mono-saturated fatty acids and from 22-39 wt. % $C_{18}$ di-unsaturated fatty acids.

6. A process according to claim 1, wherein step (2) is dry fractionation at a temperature of from 30° to 38° C.

7. A continuous process for producing an edible fat, comprising:
   (1) randomly interesterifying a starting mixture of oils comprising 30-60 wt. % of an oil (a) selected from the group consisting of soybean-, sunflower-, safflower-, rapeseed-, cottonseed-, maize-, and olive oil, wherein said oil (a) is free from crystalized fat at 10° C.; 5-40 wt. % of a partially hydrogenated oil (b) selected from the group consisting of soybean-, sunflower-, safflower-, rapeseed-, cottonseed-, maize- and olive oil, wherein said oil (b) has been subjected to hydrogenation under conditions resulting in from 30-70 wt. % fatty acids in the trans-configuration and a melting point of from 30° to 45° C.; and 25-45 wt. % of a saturated oil (c) selected from the group consisting of soybean-, sunflower-, safflower-, rapeseed-, cottonseed-, maize- and olive oil, wherein said oil (c) has an iodine value of less than 10;
   (2) fractionating the interesterified mixture to obtain a higher melting stearin fraction having substantially all the $S_3$-triglycerides in said mixture and a lower melting olein fraction containing 0-6 wt. % of said $S_3$-triglycerides;
   (3) mixing 50-100 wt. % of said olein fraction with 0-50 wt. % of an oil selected from the group of palm oil and a mixture of palm oil and palm oil hydrogenated to a melting point of from 38°-45° C. to obtain edible fat;
   (4) recirculating said stearin fraction obtained in step (2) to the starting mixture to be interesterified in step (1) in a proportion such that the fatty acid composition of the new mixture is substantially equal to the fatty acid composition of the starting mixture.

8. A continuous process according to claim 7, further comprising the step of hydrogenating said stearin fraction prior to adding it to said starting mixture.

* * * * *